US009885332B2

(12) United States Patent
Izzo et al.

(10) Patent No.: US 9,885,332 B2
(45) Date of Patent: Feb. 6, 2018

(54) FILTER ASSEMBLY FOR A FUEL INJECTOR

(71) Applicant: Continental Automotive GmbH, Hannover (DE)

(72) Inventors: Ivano Izzo, Pisa (IT); Cedric Louis Adrien Leger-Cartier, Capannoli (IT); Luca Matteucci, Pisa (IT); Marco Mechi, Vada (IT); Gianluigi Manzo, Pisa (IT)

(73) Assignee: CONTINENTAL AUTOMOTIVE GMBH, Hanover (DE)

( * ) Notice: Subject to any disclaimer, the term of this patent is extended or adjusted under 35 U.S.C. 154(b) by 0 days.

(21) Appl. No.: 15/111,590

(22) PCT Filed: Jan. 13, 2015

(86) PCT No.: PCT/EP2015/050475
§ 371 (c)(1),
(2) Date: Jul. 14, 2016

(87) PCT Pub. No.: WO2015/107037
PCT Pub. Date: Jul. 23, 2015

(65) Prior Publication Data

US 2016/0327001 A1 Nov. 10, 2016

(30) Foreign Application Priority Data

Jan. 16, 2014 (EP) .................................... 14151429

(51) Int. Cl.
*F02M 51/06* (2006.01)
*F02M 61/16* (2006.01)
(Continued)

(52) U.S. Cl.
CPC ........ *F02M 61/165* (2013.01); *F02M 61/205* (2013.01)

(58) Field of Classification Search
CPC ........... F02M 51/0653; F02M 51/0682; F02M 61/165; F02M 61/168; F02M 61/205;
(Continued)

(56) References Cited

U.S. PATENT DOCUMENTS 4,608,166 A * 8/1986 Cain ..................... B01D 29/111 210/232
5,335,863 A * 8/1994 DeGrace ............ F02M 51/0671 239/575
(Continued)

FOREIGN PATENT DOCUMENTS

DE 102007008863 A1 8/2008 .............. B23P 19/02
EP 1229239 A2 8/2002 ............. F02M 51/00
(Continued)

OTHER PUBLICATIONS

Extended European Search Report, Application No. 14151429.9, 4 pages, dated May 9, 2014.
(Continued)

*Primary Examiner* — Darren W Gorman
(74) *Attorney, Agent, or Firm* — Slayden Grubert Beard PLLC

(57) ABSTRACT

A filter assembly for a fuel injector. In some embodiments, the filter assembly has a longitudinal axis and comprises a filter element, a filter housing, and a cap. The filter element may have a cylindrical section with a first axial end and a second axial end. The tubular filter housing may receive the filter element. The tubular filter housing may include a radial protrusion supporting the first axial end of the cylindrical section when the filter element is received therein. The cap may hold the filter element at the second axial end and encompass the filter housing along an outer circumference. The second axial end may rest directly against the cap.

15 Claims, 4 Drawing Sheets

(51) Int. Cl.
*B01D 35/30* (2006.01)
*F02M 61/20* (2006.01)

(58) Field of Classification Search
CPC ....... F02M 2200/27; F02M 2200/8061; B01D 35/005; B01D 35/02; B01D 35/30
See application file for complete search history.

(56) References Cited

U.S. PATENT DOCUMENTS

| | | | | | |
|---|---|---|---|---|---|
| 5,340,032 | A * | 8/1994 | Stegmaier | F02M 51/0682 | 210/171 |
| 6,135,094 | A * | 10/2000 | Okada | F02M 37/22 | 123/470 |
| 6,328,232 | B1 * | 12/2001 | Haltiner, Jr. | F02M 51/0614 | 239/533.2 |
| 7,617,991 | B2 * | 11/2009 | Wells | F02M 61/165 | 137/544 |
| 9,200,604 | B2 | 12/2015 | Derenthal et al. | | |
| 2002/0138983 | A1 * | 10/2002 | Dallmeyer | F02M 51/005 | 123/319 |
| 2003/0052052 | A1 * | 3/2003 | Boast | F02M 51/0667 | 210/429 |
| 2005/0269426 | A1 * | 12/2005 | Cho | F02M 51/0682 | 239/533.2 |
| 2008/0035762 | A1 * | 2/2008 | Reiter | F02M 51/0614 | 239/585.1 |
| 2008/0264389 | A1 * | 10/2008 | Fochtman | B23K 26/0823 | 123/470 |

FOREIGN PATENT DOCUMENTS

| | | | | |
|---|---|---|---|---|
| EP | 1609982 | A1 | 12/2005 | F02M 51/06 |
| WO | 2005/001279 | A1 | 1/2005 | F02M 51/06 |
| WO | 2006/017535 | A1 | 2/2006 | F02M 51/005 |
| WO | 2006/017778 | A1 | 2/2006 | F02M 51/06 |
| WO | 2014/195064 | A1 | 12/2014 | F02M 61/16 |
| WO | 2015/107037 | A1 | 7/2015 | F02M 61/16 |

OTHER PUBLICATIONS

International Search Report and Written Opinion, Application No. PCT/EP2015/050475, 10 pages, dated May 26, 2015.
Korean Office Action, Application No. 2017063385470, 16 pages, dated Sep. 8, 2017.

* cited by examiner

FILTER ASSEMBLY FOR A FUEL INJECTOR

CROSS-REFERENCE TO RELATED APPLICATIONS

This application is a U.S. National Stage Application of International Application No. PCT/EP2015/050475 filed Jan. 13, 2015, which designates the United States of America, and claims priority to EP Application No. 14151429.9 filed Jan. 16, 2014, the contents of which are hereby incorporated by reference in their entirety.

TECHNICAL FIELD

The present disclosure concerns a filter assembly for a fuel injector. More specifically, the present invention concerns a filter assembly, a fuel injector, and a method for assembling the filter assembly.

BACKGROUND

A combustion engine, especially of the piston type, may use a fuel injector for injecting fuel into a combustion chamber. The fuel injector comprises a filter assembly that is commonly press-fitted into the injector in an axial direction during manufacturing the injector.

EP 1 229 239 A2 shows a fuel injector with such a filter. The filter assembly comprises a filter element and a tubular filter housing for receiving the filter element. The filter element has a side wall with a shoulder for supporting an axial end of the filter element on the filter housing.

As the filter assembly is press-fitted into the injector, considerable axial forces may act against the side wall in a region of the shoulder. The filter element may deform temporarily or permanently so that the position of an upper section of the filter assembly with respect to the injector may be poorly defined. In addition, considerable tension may occur between the shoulder and the axial end of the filter element. This may lead to a rupture of the filter element so that unfiltered fuel may pass towards the delicate valve system of the injector.

SUMMARY

It is an object of the present disclosure to describe a filter assembly, a fuel injector, and a method for assembling the filter assembly that resists deformation of the filter assembly during assembly or installation in the fuel injector.

Some embodiments may include a filter assembly (110) for an injector (100) for injecting fuel into a combustion engine. The filter assembly (110) may have a longitudinal axis (105) and comprise: a filter element (165) with a cylindrical section (180) having a first axial end (220) and a second axial end (225); a tubular filter housing (170) in which the filter element (165) is received; and a cap (175) for holding the filter element (165) at the second axial end (225). The filter housing (170) may have a radial protrusion (305) which supports the first axial end (220) of the cylindrical section (180). The cap (175) may encompass the filter housing (170) along an outer circumference. The second axial end (225) may rest directly against the cap (175).

In some embodiments, the cylindrical section (180) is provided with a chamfer (230) at its second axial end 255 and/or the cylindrical section (180) extends radially inwards further than the shoulder (305) of the filter housing (170).

In some embodiments, the filter element (165) comprises a filter screen (185) which is fixed to the cylindrical section (180) and wherein the cylindrical section (180) comprises or consists of a plastic material.

In some embodiments, the filter housing (170) and the cap (175) comprise a metal or an alloy or consist thereof.

In some embodiments, an axial length (320) of the filter housing between the protrusion (305) and the cap (175) is smaller than the axial length (315) of the cylindrical section (180) of the filter element (165).

In some embodiments, an inner diameter of the cap (175) is aligned with an outer diameter of the filter housing (170) such that the cap (175) is in force-fit engagement with the filter housing (170) with a predetermined frictional force.

In some embodiments, the filter cap (175) has an open end (325) which axially overlaps the filter housing (170) and a partially closed opposite end 330 which is positioned subsequent to the cylindrical section (180) in axial direction from the first axial end (220) towards the second axial end (225) and wherein the filter cap (175) comprises a first axial section (340) near the open end (325) and a second axial section (345) near the opposite end (330) and a taper (350) is located between said first and second axial sections (340, 345) such that an inner diameter of the second section (345) is smaller than an inner diameter of the first section (340).

In some embodiments, the inner diameter of the second section (345) is aligned with an outer diameter of the cylindrical section (180) of the filter element (165) such that the filter element (165) rests laterally against the second section (345).

In some embodiments, the filter assembly (110) is configured to be axially press-fitted with another component of the injector (100) by means of the filter housing (170).

In some embodiments, a fuel injector (100) includes a filter assembly (110) as taught above. The fuel injector may further comprise a body (125) which is a hollow valve body of the fuel injector (100) and a block (135) which is a pole piece of an electromagnetic actuator (145) of the fuel injector (100), wherein the filter assembly (110) is kept in its position in the fuel injector (100) by friction between the block (135) and the filter housing (170).

In some embodiments, the fuel injector may additionally comprise a valve needle and a calibration spring (160) for biasing the valve needle towards a closing position, wherein the filter housing (170) comprises a spring seat for the calibration spring (160) at its axial end remote from the cap (175).

Assembling a filter assembly (110) may include the following steps: inserting (405) the filter element (165) axially into the filter housing (170); and axially pressing (415) the cap (175) onto the filter housing (170) until the second axial end (225) of the cylindrical section (180) makes contact with the cap (175).

In some embodiments, the pressing is continued (420) until a predetermined pressing force is reached, the predetermined force exceeding a frictional force between the filter cap (175) and the filter housing (170).

BRIEF DESCRIPTION OF THE DRAWINGS

An exemplary embodiment of the invention will now be described in more detail with reference to the enclosed figures in which.

DETAILED DESCRIPTION

Figure 1:
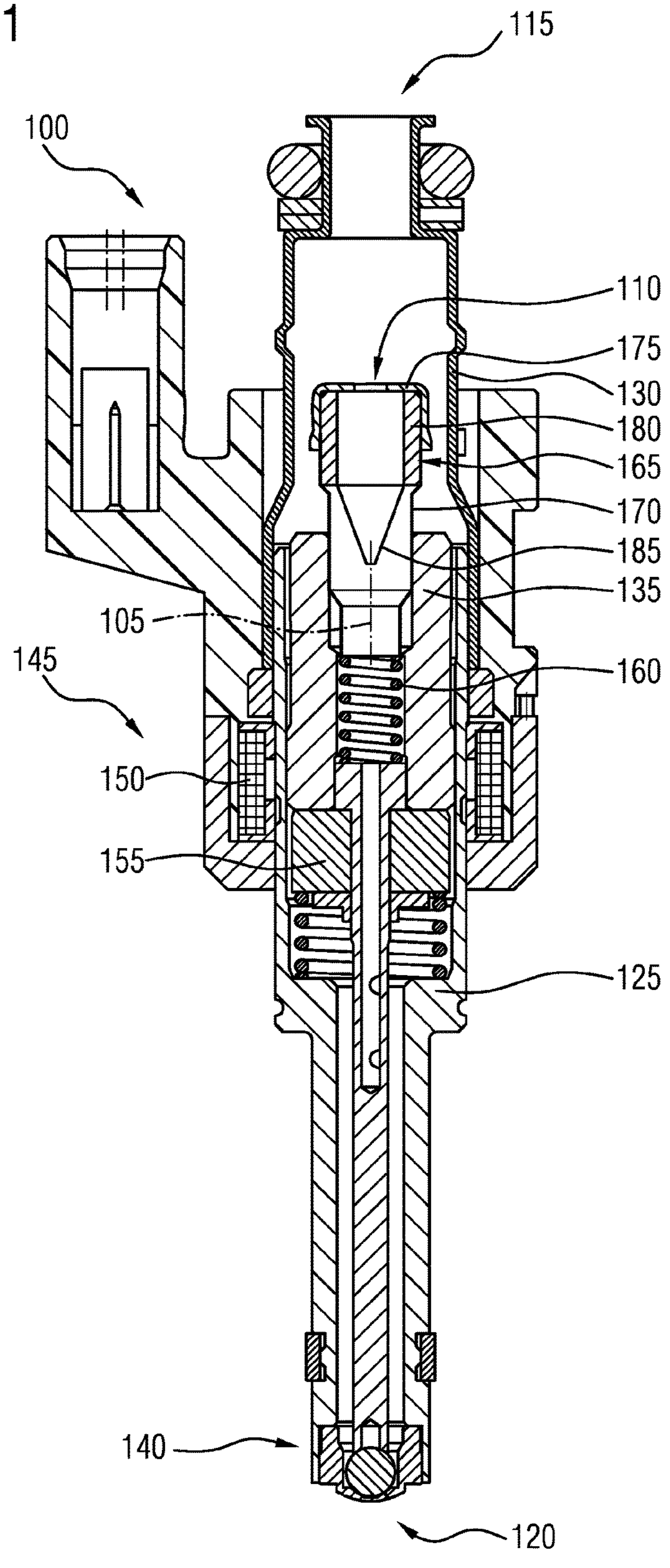
FIG. 1 shows a fuel injector in a longitudinal section view, according to teachings of the present disclosure.

In some embodiments, the filter assembly comprises a filter element with a cylindrical section having a first axial end and a second axial end. The cylindrical section may bed annularly shaped. That the section is a cylindrical section means in particular that it has a circumferential outer surface which has the basic shape of the lateral surface of a cylinder. The cylindrical section may have a central opening which extends axially through the cylindrical section. The cylindrical section may comprise a plastic material or consists of a plastic material.

Expediently, the filter element may comprise a filter screen. The filter screen may be fixed to the cylindrical section. The filter screen may axially overlap the cylindrical section and project beyond the first end of the cylindrical section.

In some embodiments, the filter assembly further comprises a tubular filter housing for receiving the filter element. The filter housing has a sidewall with a radial protrusion for supporting the first axial end of the cylindrical section. When the filter assembly is in its assembled state, the filter element is received in the tubular filter housing such that the first axial end of the cylindrical section is supported by—i.e. in particular in direct mechanical contact with—the shoulder.

In some embodiments, the filter assembly comprises a cap for holding the filter element at its second axial end. The cap encompasses the filter housing along an outer circumference. In particular for holding the filter element at its second axial end, the second axial end of the filter element rests directly against the cap. In this way, axial displacement of the cylindrical section may be blocked in one direction by the shoulder and in the opposite direction by the cap.

In some embodiments, the filter element of the present filter assembly is fixed in both axially directions without deforming the tubular filter housing—e.g. by bending an end of the filter housing radially inwards—after the filter elements has been inserted into the filter housing. In this way, undue axial strain on the filter assembly during manufacture is avoided. As axial forces during bending an end of the filter housing inwards can be as high as 1500 N and more, the filter assembly may thus be less prone to mechanical deformation or even failure during manufacture, installation or operation.

In some embodiments, the filter housing and/or the cap each comprise a metal or an alloy or, preferably, consist of a metal or of an alloy. In this way a high mechanical stability of the filter assembly is achievable.

For example, the fuel injector may comprise a valve needle and a calibration spring for biasing the valve needle towards a closing position. In this case, the filter housing may expediently comprise a spring seat for the calibration spring at its axial end remote from the cap. The filter housing may represent a calibration tube in this case and the filter assembly may be used to set a preload of the calibration spring during assembly of the fuel injection valve. The metallic housing and/or the metallic cap may provide sufficient mechanical resistance for such a calibration function of the filter assembly.

The axial length of the filter housing between the protrusion and the cap may be smaller than the axial length of the cylindrical section of the filter element. In this way, an axial force pressing the cap down onto the filter housing is not transferred to the section of the radial protrusion through sidewalls of the filter housing but rather through the cylindrical section of the filter element. In other words, a form fit connection between the cap and the tubular filter housing can be avoided in this way, which form-fit connection could otherwise unintentionally transfer unduly large axial forces from the cap to the filter housing during assembling the filter assembly or during manufacture of the fuel injection valve when the filter assembly is press fitted into another component of the fuel injection valve by pressing on the cap.

The radial protrusion may be part of a shoulder in the filter housing. The cylindrical section may extend radially inwards further than the shoulder. In this manner, a predetermined distance between the filter screen which axially protrudes beyond the cylindrical section and the filter housing can be guaranteed. Additionally or alternatively, due to the small radial extension of the shoulder, the axial force can be efficiently transferred to a tubular section of the filter housing beyond the shoulder section with a reduced risk of deformation of the filter housing.

For establishing a force-fit connection between the cap and the filter housing with a predetermined friction force during assembling the filter assembly, an inner diameter of the cap may be aligned with an outer diameter of the filter housing. Namely, the cap may be press-fitted to the filter housing. This may provide an easy installation of the cap and a secure hold of the cap on the filter housing. Consequently, the inner diameter of the cap may be aligned with the outer diameter of the filter housing such that the cap is in a force-fit engagement with the filter housing with the predetermined friction when the filter assembly is in its assembled state.

In some embodiments, the filter cap has an open end which axially overlaps the filter housing. It further has an opposite end which is positioned subsequent to the cylindrical section in axial direction from the first axial end towards the second axial end of the cylindrical section. Said opposite end is in particular partially closed. For example, it is comprised by a radially extending lid portion of the cap which is perforated in axial direction by one or more through holes. In this way, fluid can flow through the cap into the central opening of the cylindrical section and further through the filter screen into the filter housing before leaving the filter assembly at an axial end of the filter housing remote from the cap.

In some embodiments, the filter cap comprises a first axial section near its open end and a second axial section near its opposite end wherein a taper is located between said sections in such a way that an inner diameter of the second section is smaller than an inner diameter of the first section. The first section may thus be more easily pushed over the cylindrical section of the filter element during installation of the cap.

In some embodiments, the inner diameter of the second section is aligned with an outer diameter of the cylindrical section of the filter element for resting the filter element laterally against the second section. The alignment can be varied. For instance, a loose fit may be chosen if lateral stabilization is less important while a tight fit may be implemented for holding the filter element, the cap and the filter housing together in an improved manner. In particular, the cap may be configured to fix the position of the second axial end of the cylindrical section in radial direction by means of mechanical interaction with the second section of the cap.

In some embodiments, the filter assembly is adapted to be axially press-fitted with another component of the injector by means of the filter housing. For this purpose, the filter assembly may be configured such that an axial force on the cap is smoothly transferred to a part of the filter housing beyond the cylindrical section of the filter element, e.g. to a part of the filter housing which is positioned in axial direction on the side of the shoulder remote from the cap. This may imply straight walls of the filter housing to as high an extent as possible. Tapers of chamfers, however, may be added as required.

In some embodiments, the cylindrical section is provided with a chamfer at its second axial end. In this way, the risk that an unintended deformation of the cylindrical section occurs at the outer circumference of its upper edge is particularly small.

In some embodiments, the fuel injector comprises a body which is in particular a hollow valve body of the fuel injector and a block which is in particular a pole piece of an electromagnetic actuator of the fuel injector. The block may be positioned inside the body, in particular in the recess of the hollow valve body. It may expediently be positionially fixed relative to the body. The filter assembly may be kept in its position in the fuel injector by friction between the block and the filter housing. In particular, the pole piece has a central opening and the filter assembly is kept in its position by friction with a circumferential surface of the central opening of the pole piece. This may allow easily setting the preload of the calibration spring when the filter assembly has as a spring seat for the calibration spring.

According to a further aspect, a method for assembling the filter assembly is disclosed. The method for assembling the filter assembly according to at least one of the above mentioned embodiments comprises steps of inserting the filter element axially into the filter housing and axially pressing the cap onto the filter housing until the second axial end of the cylindrical section makes contact with the cap.

By using said method, a faster and more cost efficient assembly of the filter assembly may be achieved. By doing away with the risk of physical deformation of the filter housing during the manufacturing process, mechanical stability and integrity of the filter assembly may be maintained.

FIG. 1 shows an example fuel injector 100 for injecting fuel into a combustion engine, in particular in a power train of a motor vehicle. The fuel injector 100 extends along a longitudinal axis 105 and comprises a filter assembly 110 for filtering fuel on its way through the injector 100 between an inlet 115 and a tip 120. The filter assembly 110 and the fuel injector 100 may share the longitudinal axis 105 as a common longitudinal axis.

In the exemplary embodiment, the fuel injector 100 furthermore comprises a body 125, a cover 130, and a block 135. The block 135 is adapted to receive the filter assembly 110 from an axial direction and the filter assembly 110 may be adapted for press-fitting into the block 135.

The body 125 may comprise a hollow valve body of the fuel injector. The cover 130 is in particular a fuel inlet tube of the fuel injector which is hydraulically connected to the valve body to enable fluid flow from the inlet 115, which is in particular comprised by the fuel inlet tube, to the tip 120 which is in particular comprised by the valve body. The block 135 may be a pole piece of an electromagnetic actuator 145 of the fuel injector 100. The block 135 is positionally fixed with respect to the body 125.

Some embodiments may include a valve 140 for controlling a flow of fuel through the tip 120 and an actuator 145 for operating the valve 140. The actuator 145 may comprise a solenoid 150 and an armature 155. When the solenoid 150 is energized it attracts the armature 155 which is coupled to the valve 140 to displace a valve needle of the valve 140 away from its closing position so that a flow of fuel through the injector 100 is permitted.

The valve needle may be loaded with a calibration spring 160 which pushes the valve needle in a direction opposite to the attraction force of the solenoid 150 and towards the closing position. In the present embodiment, the filter assembly 110 is in contact with the calibration spring 160 on an axial side of the calibration spring 160 remote from the valve needle. The preloading force on calibration spring 160 may be adjusted by changing the axial position of filter assembly 110 with respect to block 135. Through this, dynamic flow characteristics of the injector 100 may be calibrated. Such calibration may be performed during manufacturing the injector 100.

The filter assembly 110 may comprise a filter element 165, a filter housing 170, and a filter cap 175. The filter element 165 has a cylindrical section 180, to which a screen 185 for filtering is attached. The screen 185 may comprise a fine sieve, a fleece, a woven, or non-woven fabric or the like. The cylindrical section 180 may be manufactured from a plastic by means of molding. The screen 185 may be molded to the frame 180 in the same or a successive process. The cylindrical section 180 has an annular shape with a central opening extending through the cylindrical section 180 in axial direction. Thus, the cylindrical section 180 may also be denoted as a cylindrical frame.

The filter housing 170 may be a metal part, for instance manufactured from a metal sheet by deep-drawing. The cap 175 may also comprise a formed sheet metal and it may also be manufactured by deep-drawing. The cap 175 may be press-fitted onto the filter housing 170. It is preferred that the cap 175 comprises an aperture for permitting a flow of fuel towards the filter element 165. After passing through the filter element 165, the fuel may exit through another aperture in the filter housing 170, near the bottom of filter assembly 110 in FIG. 1, to flow towards the valve 140.

Figure 2:
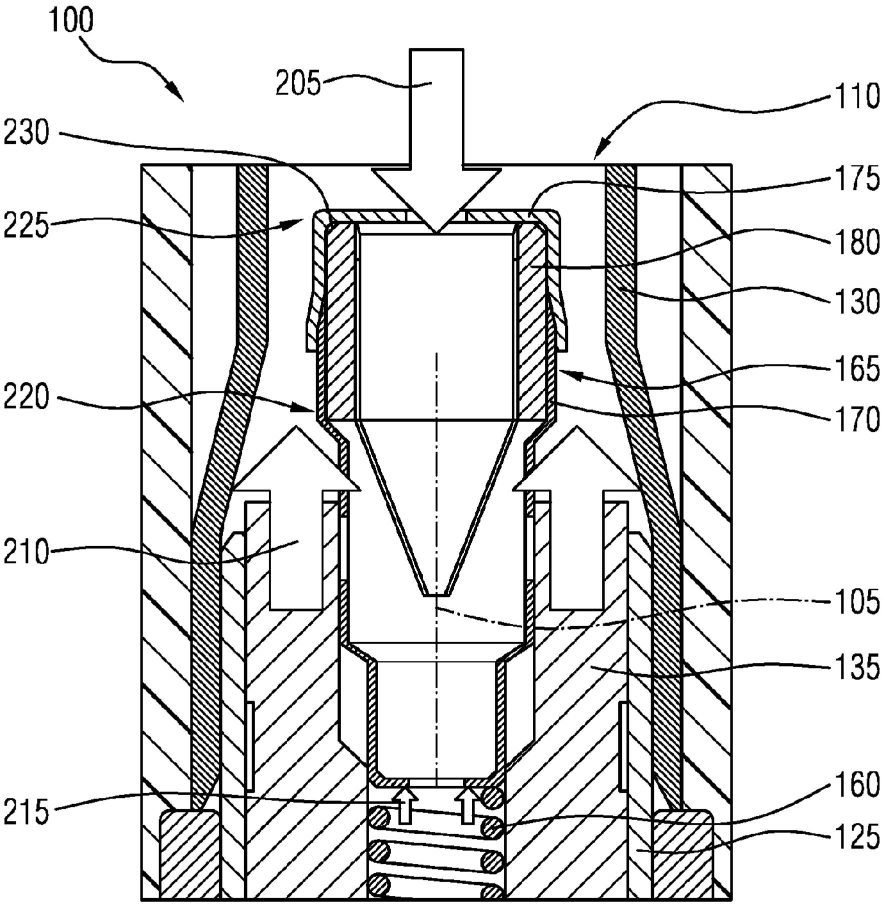
FIG. 2 shows a filter assembly being installed in the fuel injector of FIG. 1 in a longitudinal section view.

FIG. 2 shows the filter assembly 110 during installation in the fuel injector 100 of FIG. 1. A pressing force 205 is exerted to the filter cap 175 from where it is transferred to the filter housing 170 via the force-fit coupling between the cap 185 and the filter housing 180. Additionally, the pressing force 205 may be transferred to the filter housing 180 via the cylindrical section 180 of the filter element 165. The pressing force may lie in the range of 200-1000 N or even more.

Lateral friction between the filter housing 170 and the block 135 creates a resisting force 210 acting in a direction opposite to pressing force 205. Furthermore, a preloading force 215 of calibration spring 160 acts on the filter housing 170 against pressing force 205. If the pressing force 205 exceeds the sum of the resisting force 210 and the preloading force 215, the filter assembly 110 is press-fitted further into block 135 of injector 100. The press-fitting of filter assembly 110 may be carried out until a flow rate of a fluid through injector 100 has reached a desired value. Then the pressing force 205 may be removed and the filter assembly 110 is kept in its position with respect to block 135 by friction between the block 135 and the filter housing 170. Thus, the filter housing 170 may also be denoted as a calibration tube.

The filter housing 170 has a shoulder where an inner diameter of the filter housing 170 is reduced downstream the filter cap 175. The cylindrical section 180 has a first axial end 220 near the shoulder and a second axial end 225 near the cap 175 in FIG. 2. Generally, the pressing force 205 is transferred from the filter element 165 to the filter housing 170 via the cylindrical section 180 being in axial contact with the shoulder.

In some embodiments, the cylindrical section 180 includes a chamfer 230 at its second axial end 225 to ensure that a bending radius of the cap 170 between radial and axial surfaces does not get in the way of the cylindrical section 180.

Figure 3:
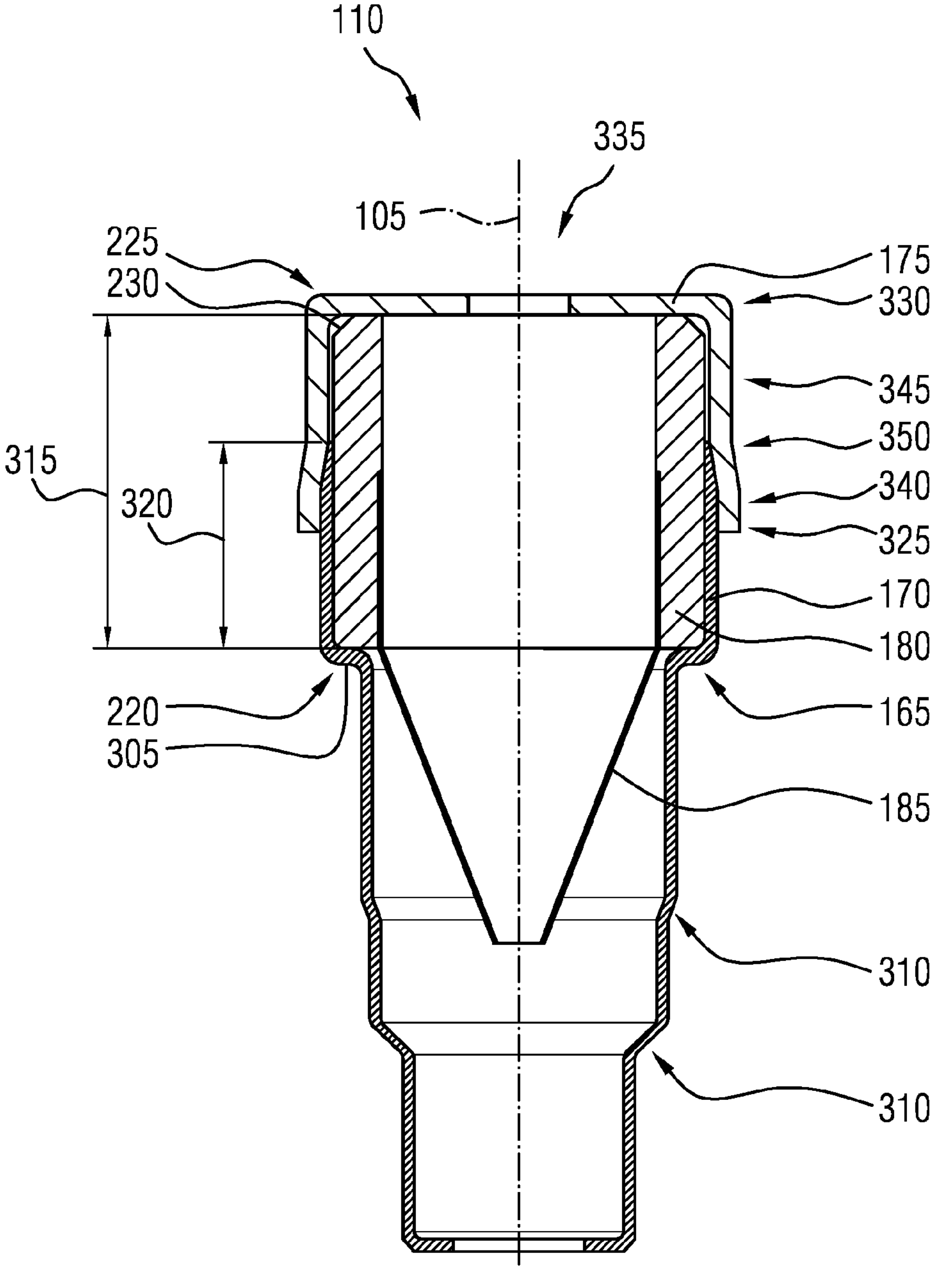
FIG. 3 shows the filter assembly according to FIG. 1 or 2 in a longitudinal section view.

FIG. 3 shows the filter assembly 110 according to FIGS. 1 and 2. Details that are not significant for the present invention may differ from the embodiments depicted in FIGS. 1 and 2.

The filter element 165 is received inside of the filter housing 170. The first axial end 220 abuts on a protrusion 305 which is, in the present example, implemented as a shoulder in the filter housing 170. The protrusion 305 may be accomplished in another way like with a diaphragm. A section of the filter housing 170 which lies on an end of the cylindrical section 180 remote from the filter element 165 may be configured for press-fitting into an element—like block 135—of the injector 100. In some embodiments, the filter housing 170 has straight walls in this section to as far an extent as possible. However, one or more tapers 310 may be introduced.

In some embodiments, the axial length 315 of cylindrical section 180 of filter element 165 exceeds the axial length 320 of a section of the filter housing 170 that extends from the protrusion 305 towards the second axial end 225 of the cylindrical section 180. This makes sure that a physical contact between the second axial end 225 of the cylindrical section 180 and an inner side of the cap 175 may be made and a radially extending lid portion of cap 175 remains axially spaced apart from the filter housing 170.

The cap 175 has an open end 325 for receiving the filter housing 170 and a lid end 330 at the opposite axial side for resting against the cylindrical section 180 on an inner side. In some embodiments, the cap 175 has an aperture 335 at the lid end 330 for permitting flow of fuel into the filter assembly 110. An inner diameter of cap 175 may be aligned with an outer diameter of the filter housing 170 in the region where it axially overlaps the filter housing 170. The alignments may be chosen in such a way that frictional forces between the cap 175 and the filter housing 170 prevent the filter housing 170 from sliding out of the cap 175.

In the present embodiment, the cap 175 comprises a first axial section 340 adjacent to the open end 325 and a second axial section 345 adjacent to the lid end 330. Between sections 340 and 345 lies a taper 350 and the inner diameter of the first section 340 is wide enough to receive the filter housing 170 while the second section 345 preferably has a smaller diameter. A bending radius of the cap 175 between the radial and axial segments—between the radially extending lid portion and the circumferential sidewall extending from the lid end 330 to the open end 325—may be sized so the chamfer 230 of the cylindrical section 180 makes no contact with the cap 175 in the bent area.

Figure 4:
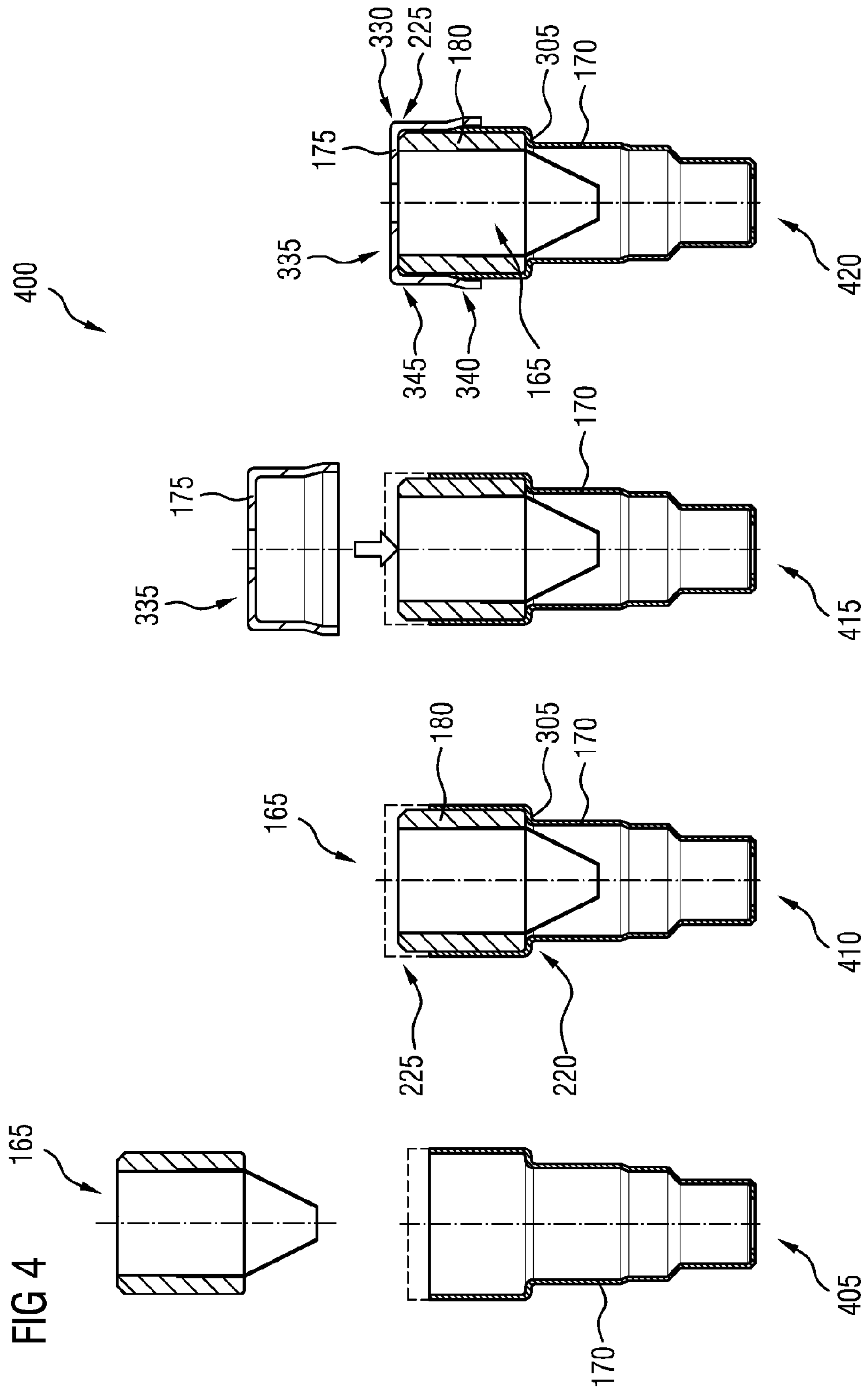
FIG. 4 shows different stages during a method for assembling a filter assembly according to FIG. 1 or 3.

FIG. 4 shows different stages of a method 400 for assembling the filter assembly 110 according to FIGS. 1 to 3. In a first step 405, the filter element 165 is axially inserted into the filter housing 170. A second step 410 shows the filter element 165 installed at a filter housing 170 in such a way that the first end 220 of cylindrical section 180 abuts on the protrusion 305 of the filter housing 170.

In a subsequent step 415, the cap 175 is axially pressed onto the filter housing 170 until an axial surface of cap 175 at lid end 330 makes contact with the second axial end 225 of cylindrical section 180 of filter element 165 as shown in a step 420. This may require a pressing force which overcomes a frictional force between the first axial section 340 and the filter housing 170 and/or between the second axial section 345 and the cylindrical section 180. The frictional forces may be determined by an alignment of inner diameters of the cap 175 and outer diameters of the cylindrical section 180 or the housing 170.

In some embodiments, the pressing continues until the pressing force exceeds a predetermined force which is larger than the sum of the predetermined frictional forces. This serves to ensure that the cylindrical section 180 lies between the lid end 330 of the cap 175 and the protrusion 305 of the filter housing 170 in an axial manner.

What is claimed is:

1. A filter assembly for a fuel injector in a combustion engine, the filter assembly having a longitudinal axis and comprising:

a filter element with a cylindrical section having a first axial end and a second axial end;

a tubular filter housing to receive the filter element;

the tubular filter housing including a radial protrusion supporting the first axial end of the cylindrical section when the filter element is received therein; and a cap holding the filter element at the second axial end, the cap encompassing the filter housing along an outer circumference;

wherein the second axial end rests directly against the cap.

2. A filter assembly according to claim 1, wherein the cylindrical section includes a chamfer at its second axial end.

3. A filter assembly according to claim 1, wherein the filter element comprises a filter screen fixed to the cylindrical section.

4. A filter assembly according to claim 1, wherein the filter housing and the cap comprise a metal.

5. A filter assembly according to claim 1, wherein an axial length of the filter housing between the protrusion and the cap is smaller than the axial length of the cylindrical section of the filter element.

6. A filter assembly according to claim 1, wherein an inner diameter of the cap is aligned with an outer diameter of the filter housing such that the cap is in force-fit engagement with the filter housing with a predetermined frictional force.

7. A filter assembly according to claim 1, wherein the filter cap includes:

an open end axially overlapping the filter housing; and a partially closed opposite end which is positioned subsequent to the cylindrical section in axial direction from the first axial end towards the second axial end;

a first axial section near the open end;

a second axial section near the opposite end; and a taper located between said first and second axial sections;

wherein an inner diameter of the second section is smaller than an inner diameter of the first section.

8. A filter assembly according to claim 7, wherein the inner diameter of the second section is aligned with an outer diameter of the cylindrical section of the filter element such that the filter element rests laterally against the second section.

9. A filter assembly according to claim 1, wherein the filter assembly is configured to be axially press-fitted with another component of the injector by means of the filter housing.

10. A fuel injector comprising:

a filter element with a cylindrical section having a first axial end and a second axial end opposite along a central longitudinal axis;

a tubular filter housing to receive the filter element;

the tubular filter housing including a radial protrusion supporting the first axial end of the cylindrical section when the filter element is received therein; and a cap holding the filter element at the second axial end, the cap encompassing the filter housing along an outer circumference;

wherein the second axial end rests directly against the cap;

a hollow valve body;

a block which is a pole piece of an electromagnetic actuator;

wherein the filter assembly is kept in position in the fuel injector by friction between the block and the filter housing.

11. A fuel injector according to claim 10, further comprising:

a valve needle; and a calibration spring biasing the valve needle towards a closing position;

wherein the filter housing comprises a spring seat for the calibration spring at its axial end remote from the cap.

12. A method for assembling a filter assembly comprising a filter element, a tubular filter housing to receive the filter element, a radial protrusion supporting a first axial end of a cylindrical section of the filter element, and a cap holding the filter element at a second axial end of the cylindrical section, the cap encompassing the filter housing along an outer circumference, the method comprising:

inserting the filter element axially into the filter housing;

axially pressing the cap onto the filter housing until the second axial end of the cylindrical section makes contact with the cap.

13. A method according to claim 12, further comprising pressing the cap until a predetermined pressing force is reached, the predetermined force exceeding a frictional force between the filter cap and the filter housing.

14. A filter assembly according to claim 1, wherein the cylindrical section extends radially inwards further than the radial protrusion of the filter housing.

15. A filter assembly according to claim 1, wherein the cylindrical section comprises a plastic material.

* * * * *